Patented Apr. 16, 1929.

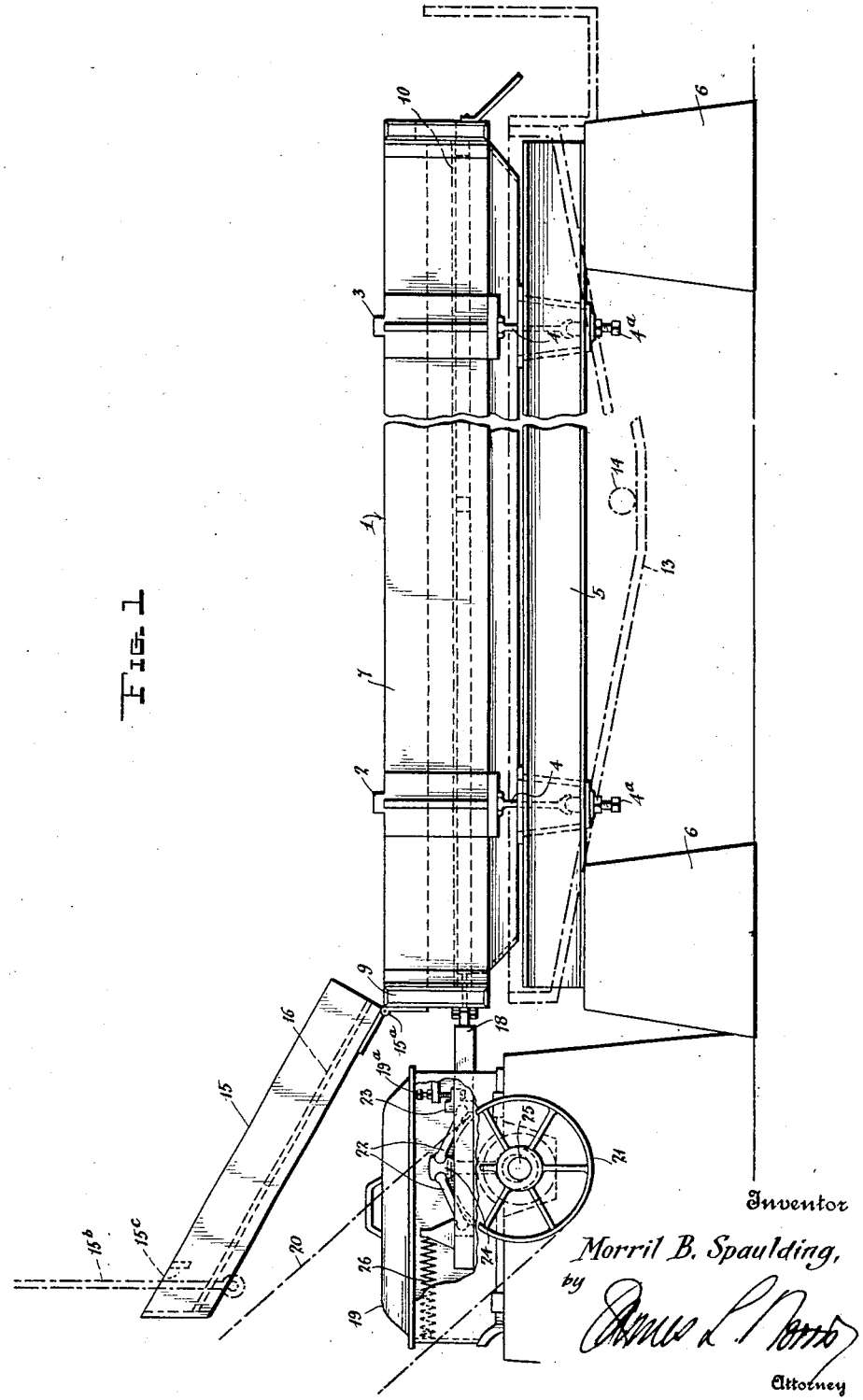

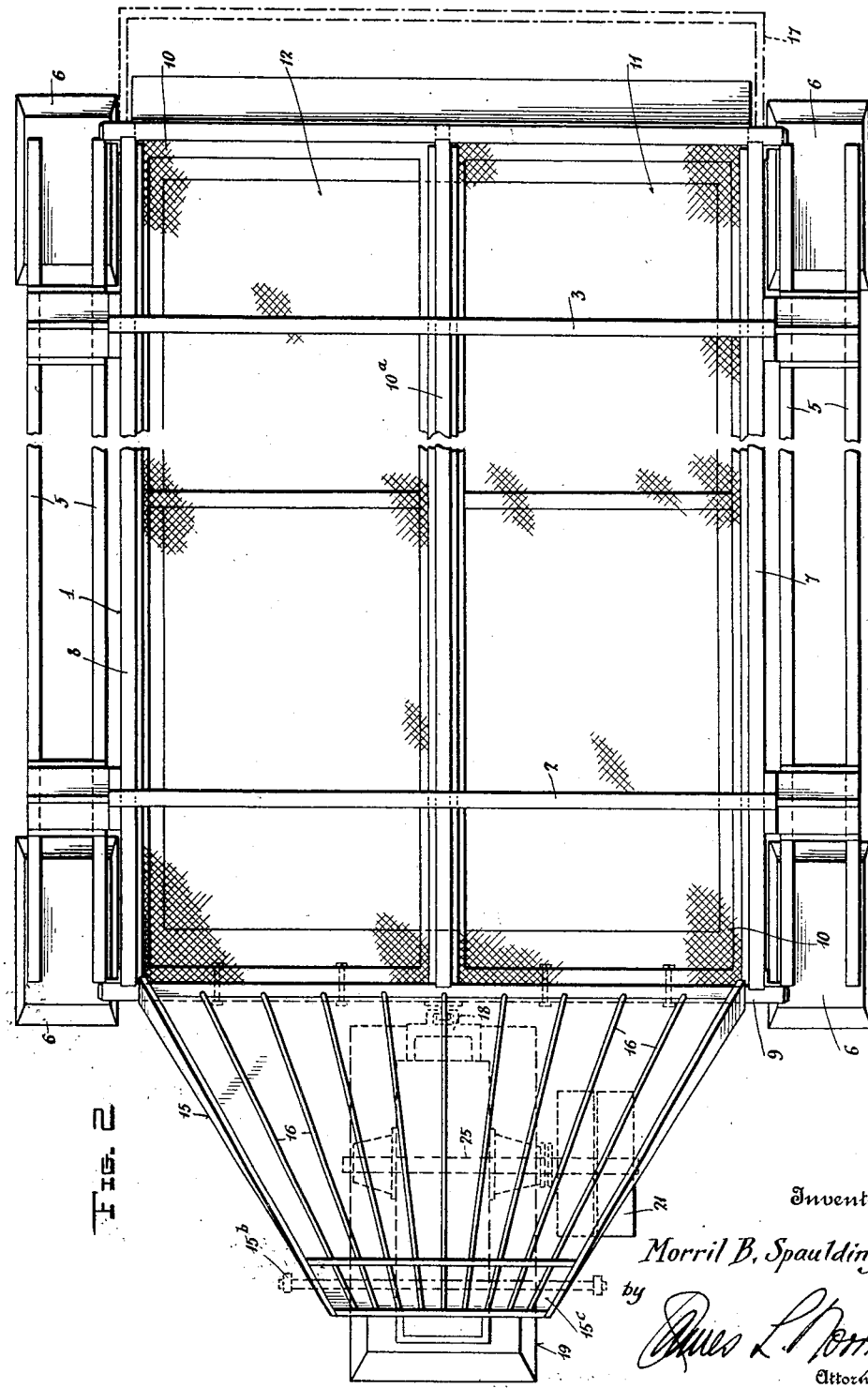

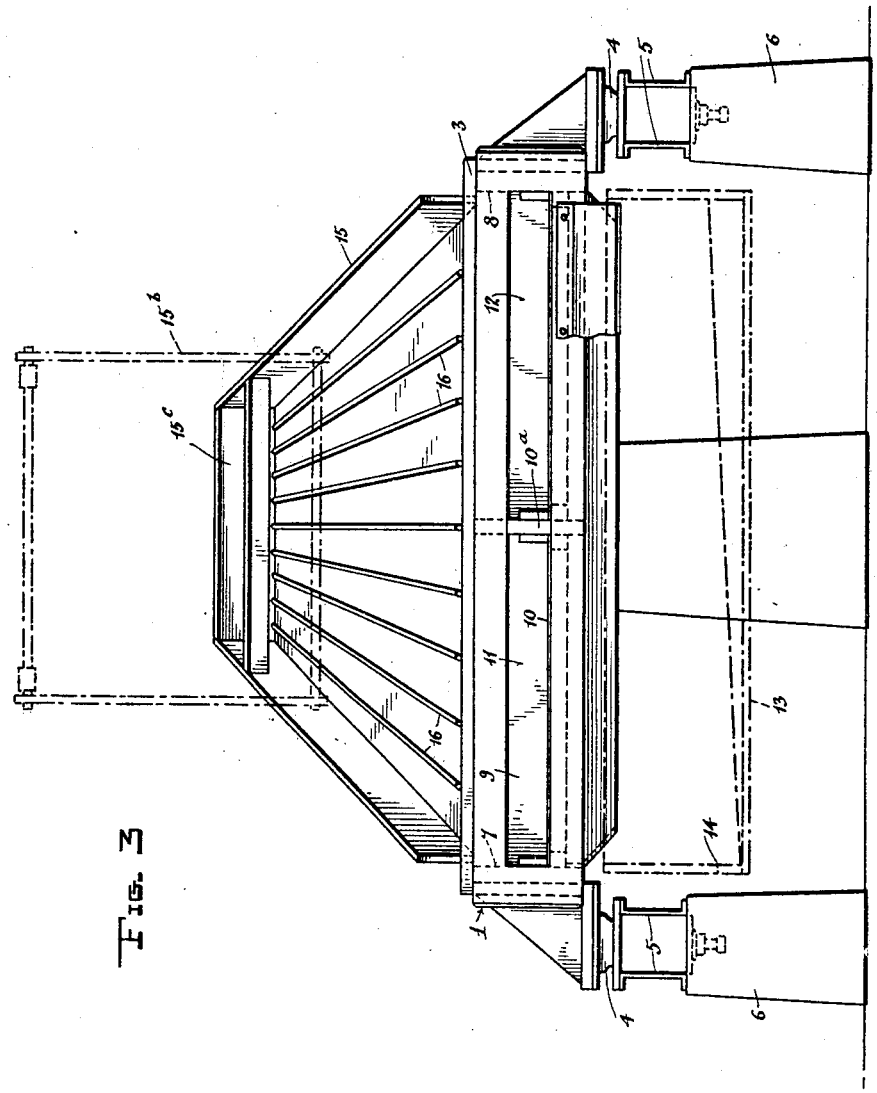

1,709,286

UNITED STATES PATENT OFFICE.

MORRIL B. SPAULDING, OF WAYNE, PENNSYLVANIA.

METHOD OF AND APPARATUS FOR FILTERING SUSPENDED ORGANIC MATTER FROM LIQUIDS.

Application filed June 1, 1926, Serial No. 113,013, and in Cuba June 5, 1925.

The present invention relates to a method of and an apparatus for filtering suspended organic matter from liquids, and it is adapted for use more particularly in sugar mills to filter the sugar juice or other juice extracted from the cane, or similar material, it being especially applicable to the separation of bagasse and bagasillo from raw sugar juice and of cachassa or the finer residues from cooked sugar juice.

Heretofore, in the sugar industry, the several filtering operations to which the juices extracted from the sugar cane and similar material are subjected, especially the first filtering operation to which the raw juice is subjected as the same comes from the crushing rollers, has been performed by flowing the juice into a screen composed of metallic cloth, vegetable fibers, perforated sheets or other filtering surface so that the liquid may pass through the meshes or perforations of the filtering surface and collect in a suitable receptacle while the solid particles carried in suspension by the liquid are retained on the upper surface of the filtering cloth or screen, but such method presented the great objection that the solid particles which are intercepted by and retained on the filtering cloth or screen accumulated thereon, thereby closing or clogging the holes or perforations in the filtering surface to an increasing extent until eventually the holes or perforations in the filtering surface become more or less completely obstructed, thereby preventing the discharge of the liquid through the filtering surface. In order to overcome this difficulty and thus enable the filtering operation to be continued, it has been necessary to employ attendants equipped with scrapers and who must manually remove the obstructing material and thus permit the liquid to flow through the holes or perforations in the filtering surface. This procedure has been objectionable because of the labor and expense involved and the relative inefficiency of the filtering operation.

The primary object of the present invention is to overcome these disadvantages, the present invention providing a method of and an apparatus for filtering or separating suspended organic matter from the juices or liquids by flowing the liquids or juices containing the organic matter suspended therein onto a filtering surface which has a motion of such character as to avoid clogging of the screen perforations by the solid particles which are separated from the liquid and which motion, at the same time, effects discharge from the screen surface of the solid matter separated from the liquid. Preferably, the screen surface is reciprocated with a series of impulses of an abrupt character, the motion of the screen surface in one direction being more rapid or abrupt than its motion in the opposite direction, this differential reciprocatory motion of the screen surface preventing the accumulation of the separated solid matter from clogging the screen perforations so that the liquid may pass rapidly or without obstruction through the screen surface and at the same time the accumulated solid matter separated from the liquid will be fed or advanced toward an end or edge of the screen surface from which it may be discharged. The invention thus renders unnecessary the employment of manual labor to scrape the surface of the screen as the differential motion to which the screen is subjected according to the present invention will maintain the filtering or screen surface free of obstructing solid materials, and the efficiency of the filtering operation is increased as the flow of the liquid does not become impeded by the accumulation of separated solid matter on the screen surface.

A further object of the invention is to provide filtering apparatus which effects separation of the solid matters from the liquids and also by the same operation delivers the separated liquid and solid matters separately so that the liquid freed of suspended solid matter and the solid matter filtered out of the liquid may be further handled with facility.

To these and other ends the invention consists in certain improvements as will hereinafter appear, the features of novelty being pointed out particularly in the claims at the end of the specification.

In the accompanying drawings—

Figure 1 is a side elevation of a filtering apparatus of the preferred form used in carrying out the invention;

Figure 2 is a top plan view of the apparatus shown in Figure 1; and

Figure 3 is an end view of the apparatus shown in Figure 1 as viewed from the right-hand end thereof.

Similar parts are designated by the same reference characters in the different figures.

The present invention is applicable generally to the separation of organic matters from liquids in which they are suspended, although the invention is particularly applicable to the separation of bagasse and bagasillo from raw sugar juice as the same comes from the cane crushing mill and the separation of cachassa or the finer residues from cooked sugar juice after defecation. The preferred method and apparatus employed will be hereinafter described in detail, but it is to be understood that the invention is not restricted to the precise method or apparatus shown as equivalents thereof are contemplated and such will be included within the scope of the claims.

The apparatus shown in the present instance for carrying out the invention comprises a table 1 which consists substantially of a frame which may be composed of metal, wood or any other suitable material, the table being supported by transverse shafts 2 and 3. These shafts are provided at their ends with rockers or rollers 4, and these rockers or rollers are mounted on stationary beams 5, the latter being, in turn, mounted on pedestals or supports 6 which are rigid upon the ground floor or other support. The mounting of the table on the rockers or rollers as described enables the table to be reciprocated longitudinally, and the rockers 4 shown in the present instance are provided with screws 4ª which enable the rockers which support opposite ends of the table to be set at different heights, thereby enabling the table to be set either in a horizontal or level position, or in a position inclined more or less from the horizontal. The table has side walls 7 and 8 which project upwardly therefrom, and one end of the table, which may be termed the "head" thereof, is provided with a head wall 9 which also projects upwardly from the table, the opposite or tail end of the table being open for the discharge of the separated solid matter from the screen or filtering surface. The screen or filtering surface which is carried by the reciprocatory table may comprise a woven screen, vegetable fiber, a perforated sheet or any other material suitable for filtering, this screen, designated 10, being stretched across and secured to the framework of the table so as to form the bottom or floor thereof. The filtering space of the table may be undivided, if desired, but it is preferably divided by one or more partitions 10ª extending longitudinally of the table to form a plurality of compartments or sub-divisions 11 and 12 of the filtering area.

Beneath the table is placed a liquid receiving or collecting tray 13 to catch and collect the juice or liquid which passes through the filtering or screen surface. The bottom of this tray is preferably inclined from its ends and toward its center and the tray is provided at its lowest point with an outlet opening 14 through which the collected liquid or juice may be discharged.

At the head end of the table is placed a feeder 15 which receives the liquid to be filtered, this feeder being preferably in the form of a trough which flares or widens toward the head end of the filtering table, and the bottom of the feeder is preferably provided with a series of upwardly projecting diverging riffles 16 which serve to spread or distribute the liquid uniformly or substantially so across the full width of the filtering table, so that the entire filtering or screen surface will be utilized in filtering the liquid. The feeder may be mounted in any suitable manner, the end of the feeder adjacent to the head of the table being shown hinged to the table, as at 15ª, and the opposite end of the feeder being suspended by a swinging support 15, so that the feeder may participate in the reciprocatory movements of the table. The juice or liquid to be filtered may be conducted to and discharged into the feed box 15ᶜ at the upper end of the feeder by a pipe or other suitable means.

At the tail end of the table or the end thereof opposite to that which receives the liquid or juice to be filtered is placed a conveyer 17 which receives the bagasillo or other solid matter which is discharged from the open or tail end of the table, this conveying apparatus delivering the discharged solid material to a point in the mill where such material may receive further treatment.

The head of the table is connected by a bar 18 to an impulse mechanism 19, which mechanism consists preferably of a Wilfley motion or an equivalent mechanism capable of shaking the table with differential reciprocations, the return movements or movements of the table toward the left in Figure 1 being more rapid than the forward movements or the movements of the table toward the right in that figure. The impulse mechanism may be driven continuously during the filtering operation from an electric motor or any other suitable source of power, the driving shaft of the mechanism being shown fitted in the present instance with a belt pulley 20 which receives motion from a driving belt 21.

In filtering juice extracted from the cane by the crushing rolls, this liquid is conveyed to and discharged into the feed box at the upper end of the feeder 15. As this liquid flows downwardly over the inclined surface of the feeder toward the table, the divergent riffles on the bottom of the feeder spread or distribute the juice uniformly or substantially so across the width of the table, the liquid being thus caused to flow inwardly onto the filtering or screen surface. The liquid passes through the perforations in the filtering or screen surface and falls into the pan 13 where it is collected, while the suspended solid matters in the juice or liquid are intercepted by the screen surface and are retained thereon. During this filtering operation, the impulse mechanism 19 operates continuously, it imparting differential reciprocatory movements to the table in the direction of its length and in a horizontal plane or in a more or less inclined plane if such may be desired. The forward motion or motion of the table toward the right in Figure 1 is relatively slow, while the return motion or the motion of the table toward the left in Figure 1 is quicker or more abrupt. As a result of these two differential movements of the table, the filtering or screen surface will be shifted in such a manner beneath the solid matter accumulated thereon as to prevent settling of the solid matter over the perforations in the screen, thereby avoiding clogging of the screen perforations, and, hence, the filtering operation may proceed continuously and efficiently although manual scraping of the accumulated solid matter retained on the filtering or screen surface is avoided. Furthermore, the differential motion imparted to the table, due to the greater speed of the table on its return strokes as compared with its forward strokes, causes the accumulated solid matter on the filtering or screen surface to be advanced to the open tail end of the table and to be expelled therefrom into the conveyor 17. In this manner, the solid matter separated from the juice or liquid is progressively or continuously removed from the filtering or screen surface without the necessity of employing manual labor for the purpose, and, hence, the solid matter cannot accumulate on the filtering or screen surface to an extent that would impair the efficiency of the filtering operation. The filtered juice or liquid may be withdrawn through the discharge opening 14 in the collecting pan beneath the filter and the solid matter separated from the liquid or juice is removed separately by the conveyor 17.

The differential reciprocatory movements of the filtering surface may take place in the plane of said surface or in directions at various angles thereto, and the filtering surface may occupy a level or horizontal position or it may be inclined during its operation. Also the intensity of the vibrations or reciprocations of the filtering surface may be regulated to suit different conditions, the "Wilfley" motion shown diagrammatically in the present instance being provided for this purpose with an adjusting screw 19ª. The "Wilfley" motion as shown comprises a toggle the links 22 of which are accommodated within the bar 18 which is yoke-shaped, the outer ends of the links bearing respectively against the end of the yoke and a block 23 anchored in the casing, but capable of vertical movement by adjustment of the screw 19ª to regulate the strokes of the table. The toggle links are flexed by a pitman 24 reciprocated by an eccentric on the driving shaft 25 and the parts of the toggle mechanism are held in working relation by a compression spring 26. The rockers 4 in swinging about their lower supports cause the table to move through arcuate paths about these lower supports, thus assisting the filtering operation.

I claim as my invention:—

1. The method of separating suspended organic matter from liquid which comprises flowing the liquid containing the organic matter suspended therein onto a screen surface adapted to permit passage of the liquid therethrough and to intercept and accumulate thereon the organic matter, and concurrently imparting to said surface differential reciprocatory movements which relatively shift said surface and the matter accumulated thereon and thereby prevent clogging of said surface by the matter accumulated thereon and permit unobstructed passage of the liquid through said surface.

2. The method of separating suspended organic matter from sugar juice which comprises flowing the juice onto a filtering surface adapted to intercept and retain thereon the suspended organic matter and to permit the juice to pass therethrough, and concurrently imparting reciprocating movements to said surface relatively to the accumulated organic matter thereon, the movements of said surface in one direction being more abrupt than the movements in the other direction whereby the matter accumulated on said surface is caused to travel thereover and to discharge therefrom while said surface is maintained in an unclogged condition to permit the juice to pass therethrough.

3. A filter for liquids comprising a filtering surface adapted to allow the liquid to pass through it and to retain thereon solid matter carried in suspension by the liquid, means for flowing the liquid to be filtered onto said surface to advance the solid matter accumulated thereon, and means for imparting differential reciprocatory movements to said surface whereby clogging of the filtering surface by solid matter is prevented.

4. A filter for liquids comprising a filtering surface adapted to allow the liquid to pass through it and to retain thereon solid matter carried in suspension by the liquid, said surface having a discharge at an edge thereof for the solid matter, means for flowing the liquid to be filtered onto said surface, and means for imparting differential reciprocatory or shaking movements to the filtering surface whereby the solid matter accumulated on the filtering surface is caused to move thereover and to be expelled through said discharge and clogging of the filtering surface is prevented.

5. A filter for liquids comprising a filtering surface adapted to allow the liquid to pass through it and to retain thereon solid matter carried in suspension by the liquid, means for movably supporting said surface whereby it may be reciprocated, means for feeding the liquid to be filtered onto said surface, and means for imparting differential reciprocatory movements to said surface whereby the solid matter accumulated thereon is advanced over said surface.

6. A filter comprising a filtering surface adapted to allow liquid to pass therethrough and to retain thereon solid matter carried in suspension in the liquid, means for supporting said surface whereby it may reciprocate, means for adjusting said surface to vary the plane in which it operates, means for feeding the liquid to be filtered onto said surface, and means for imparting differential reciprocatory movements to said surface whereby the solid matter accumulated thereon is advanced thereover.

7. A filter comprising a filtering surface adapted to allow liquid to pass therethrough and to retain thereon solid matter carried in suspension in the liquid, means arranged below said surface to collect liquid filtered therethrough, means arranged at an edge of said surface to collect solid matter accumulated thereon, and means for imparting differential reciprocatory movements to said surface whereby solid matter accumulated thereon is advanced thereover and discharged into said collecting means.

8. A filter comprising a filtering surface adapted to pass liquid therethrough and to retain thereon solid matter carried in suspension by the liquid, means for conducting the liquid to be filtered to said surface embodying a feeder adapted to receive the liquid and having a bottom extending toward the filtering surface for conducting the liquid thereto, and for distributing the liquid evenly over the width thereof, and means for imparting differential reciprocatory movements to said surface whereby the solid matter accumulated thereon is advanced thereover in a direction away from said feeder.

9. A filter comprising a filtering surface adapted to pass liquid therethrough and to intercept solid matter carried in suspension by the liquid, one edge of said surface being open for the discharge of the solid matter from the filtering surface, and the other edges of said surface having upstanding walls, means for feeding the liquid to be filtered on to the portion of the filtering surface opposite to the discharge edge thereof, and means for imparting differential reciprocatory movements to said surface to advance thereover solid matter accumulated thereon whereby the filtering perforations of said surface are kept unclogged by the accumulated solid matter and the solid matter is advanced toward said discharge edge.

In testimony whereof I have hereunto set my hand.

MORRIL B. SPAULDING.